Feb. 23, 1926.
A. C. HOWARD
1,574,654
POWER DRIVEN CULTIVATOR
Filed Sept. 23, 1925    8 Sheets-Sheet 4
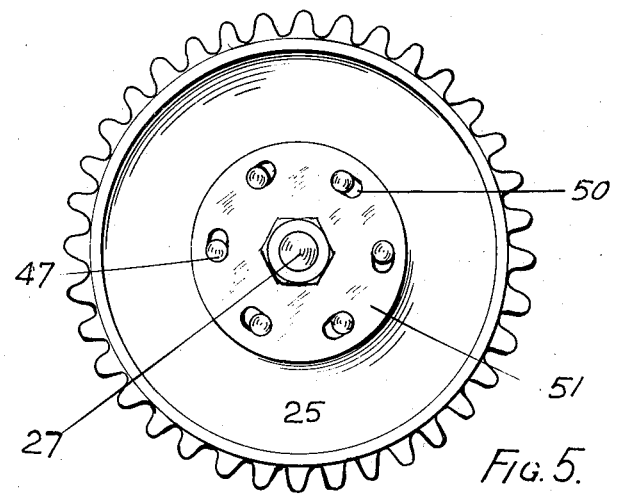
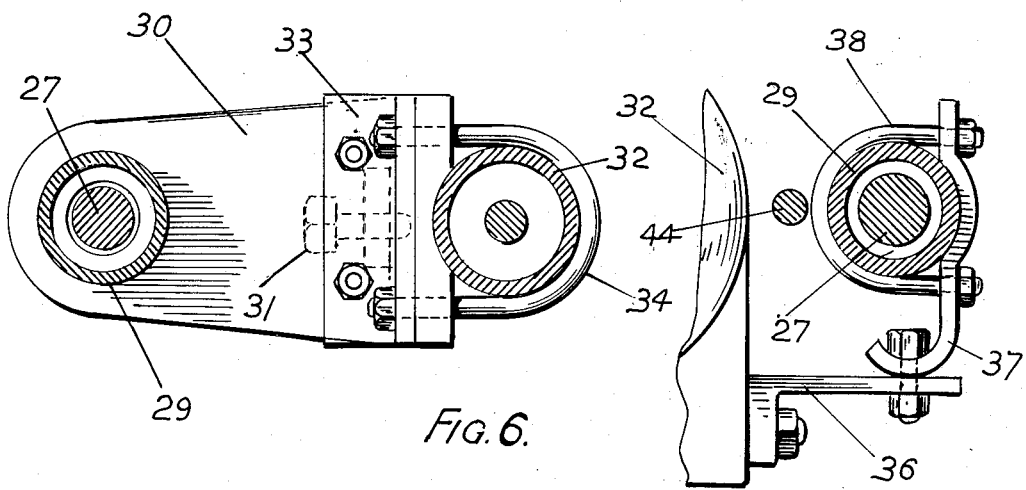
INVENTOR
A. C. Howard
By Marks + Clerk
attys

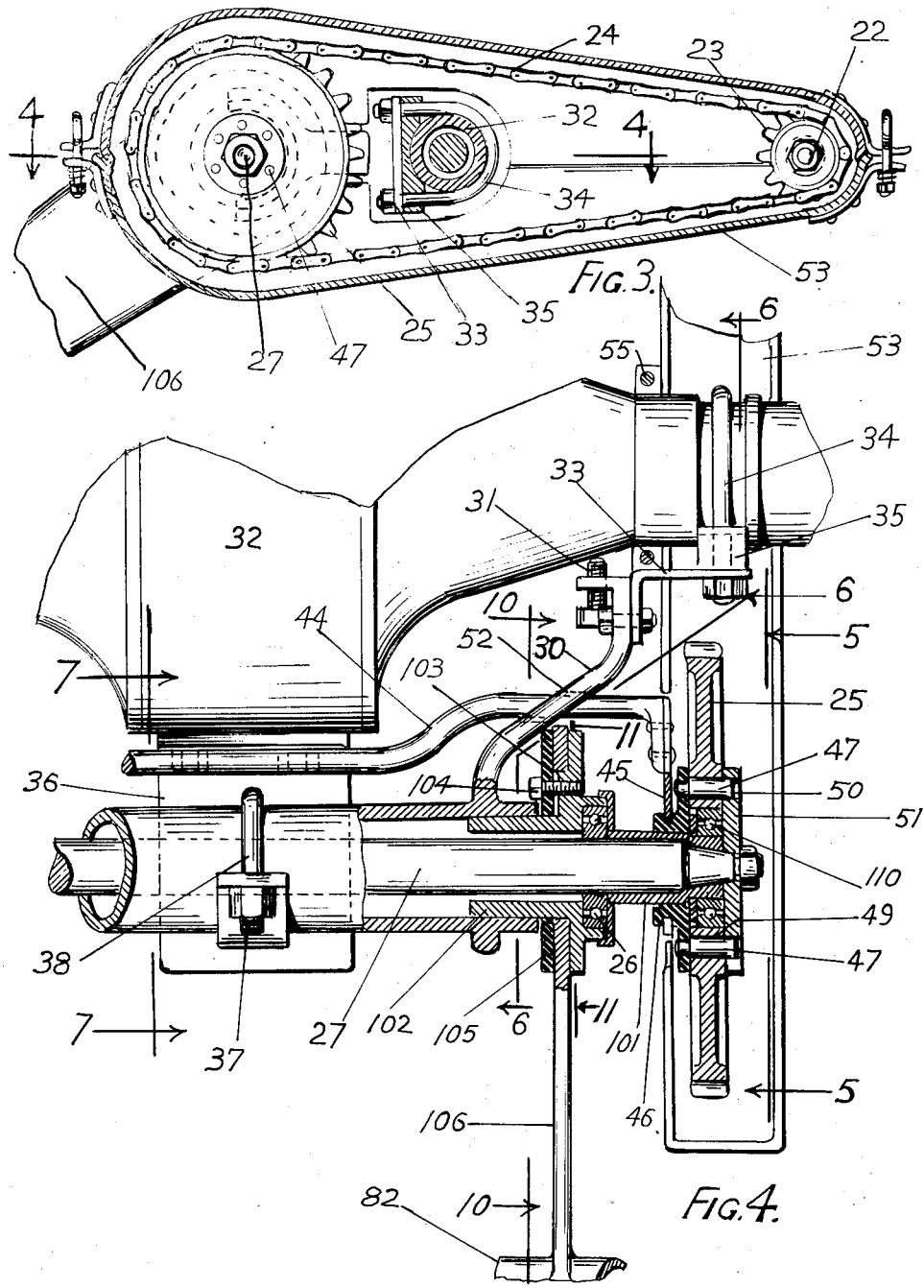

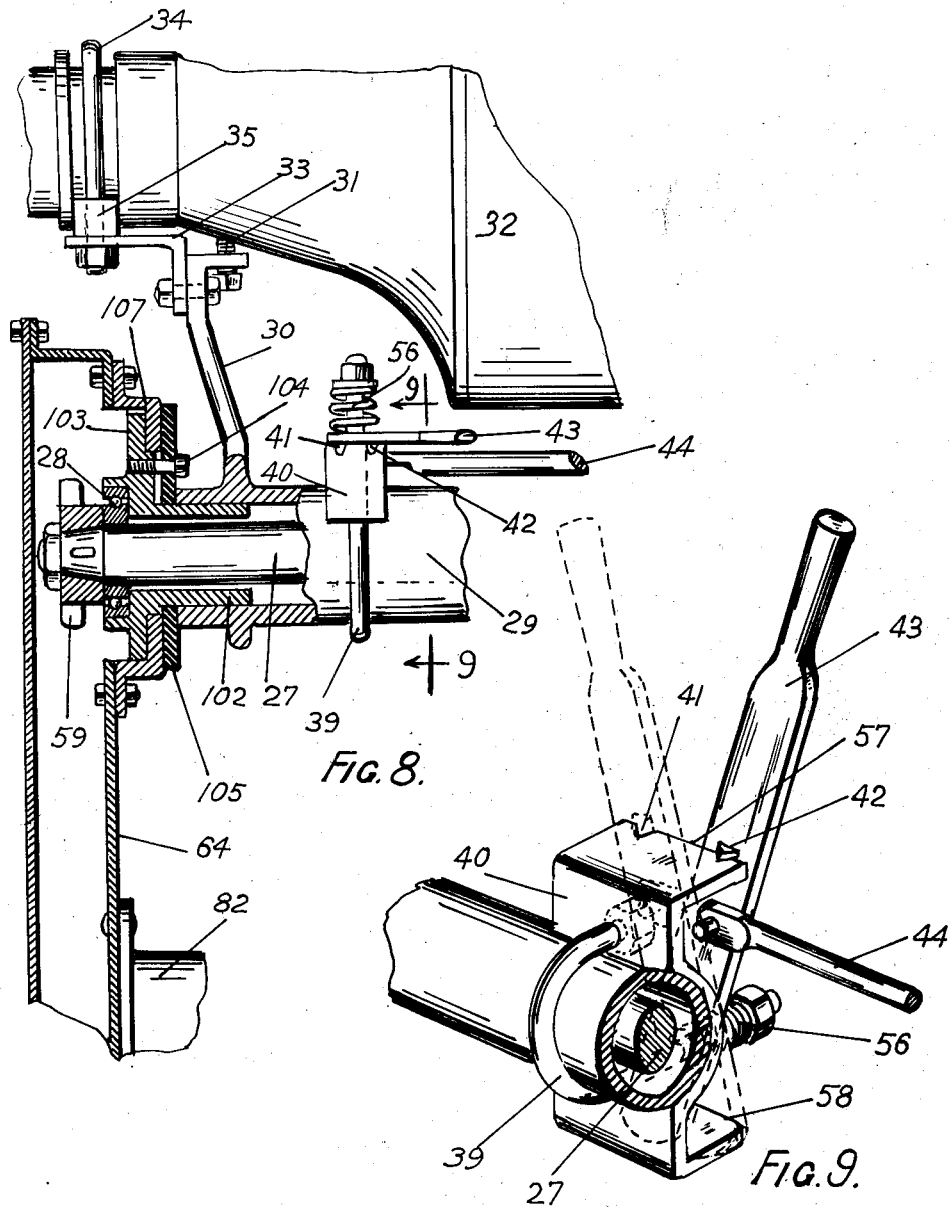

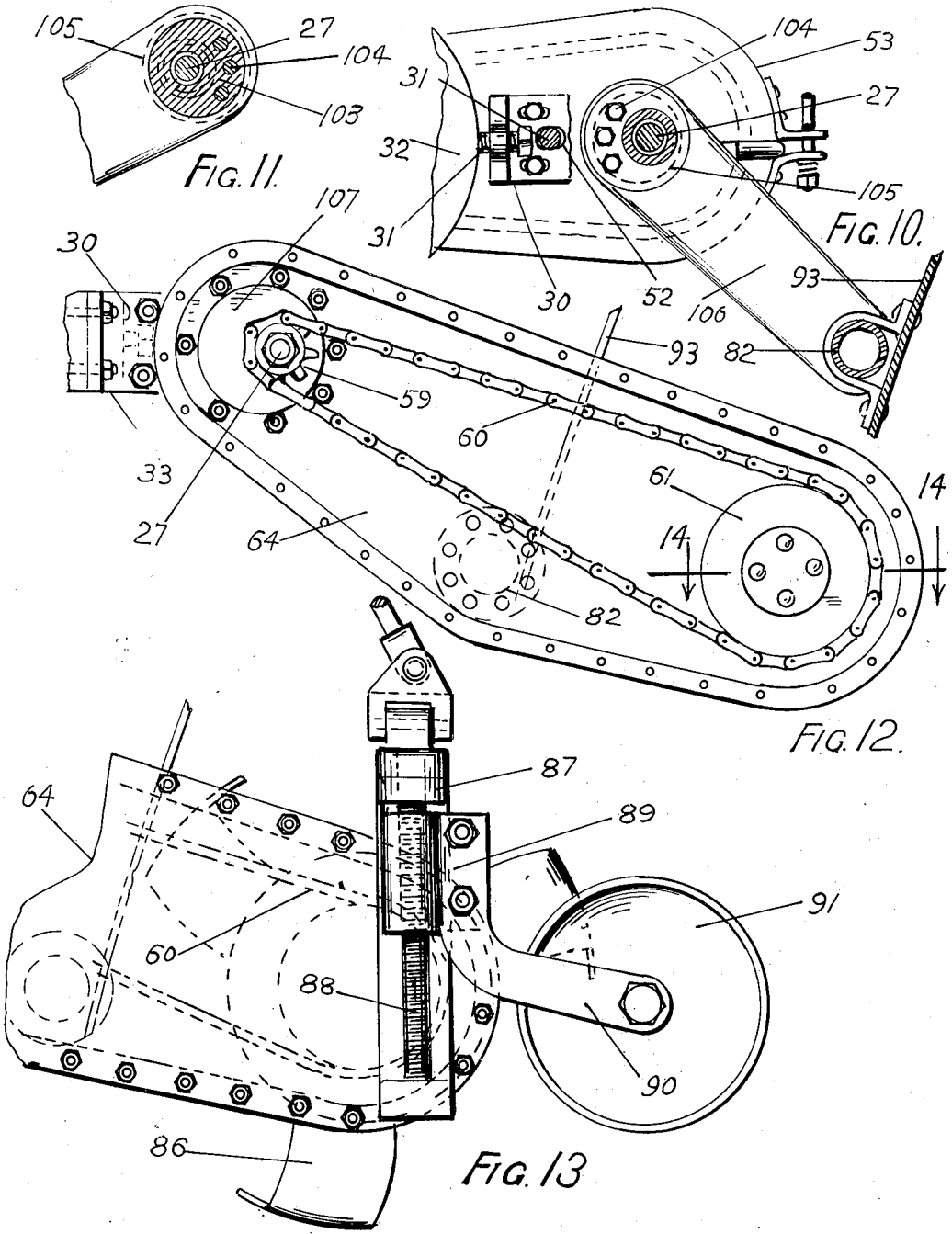

Feb. 23, 1926.

A. C. HOWARD 1,574,654

POWER DRIVEN CULTIVATOR

Filed Sept. 23, 1925   8 Sheets-Sheet 7

INVENTOR
a. C. Howard
By Marks & Clerk
attys

Patented Feb. 23, 1926.

1,574,654

UNITED STATES PATENT OFFICE.

ARTHUR CLIFFORD HOWARD, OF MOSS VALE, NEW SOUTH WALES, AUSTRALIA.

POWER-DRIVEN CULTIVATOR.

Application filed September 23, 1925. Serial No. 58,162.

*To all whom it may concern:*

Be it known that I, ARTHUR CLIFFORD HOWARD, subject of the King of Great Britain and Ireland, residing at "Aylesbury," Argyle Street, Moss Vale, New South Wales, Commonwealth of Australia, have invented new and useful Power-Driven Cultivators, of which the following is a specification.

This invention relates to power driven cultivator means which may be attached to a tractor and driven by means associated with the tractor engine.

The invention has for its object to provide a cultivator which may be so applied and adjusted with respect to a tractor that the same may be efficiently, economically and conveniently operated for cultivating purposes.

Figure 1:
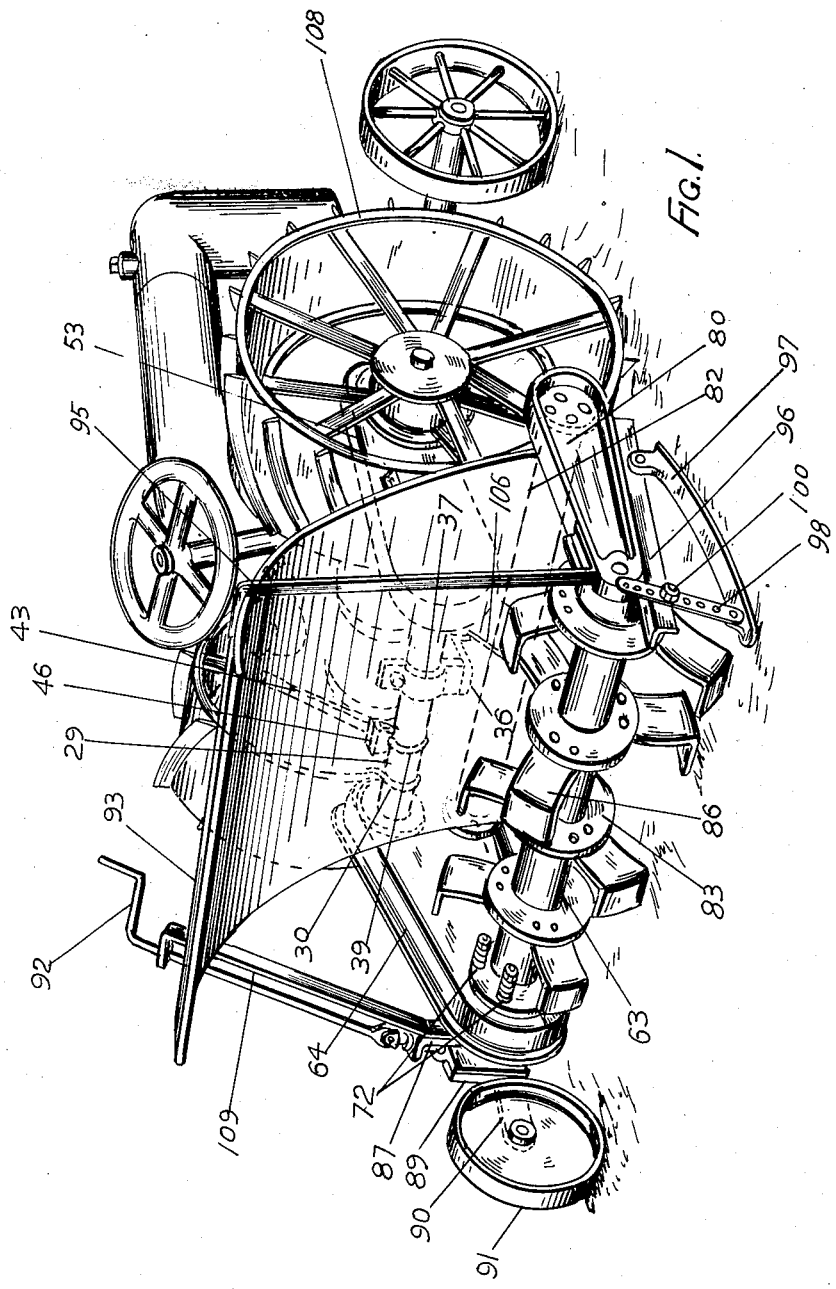
Figure 2:
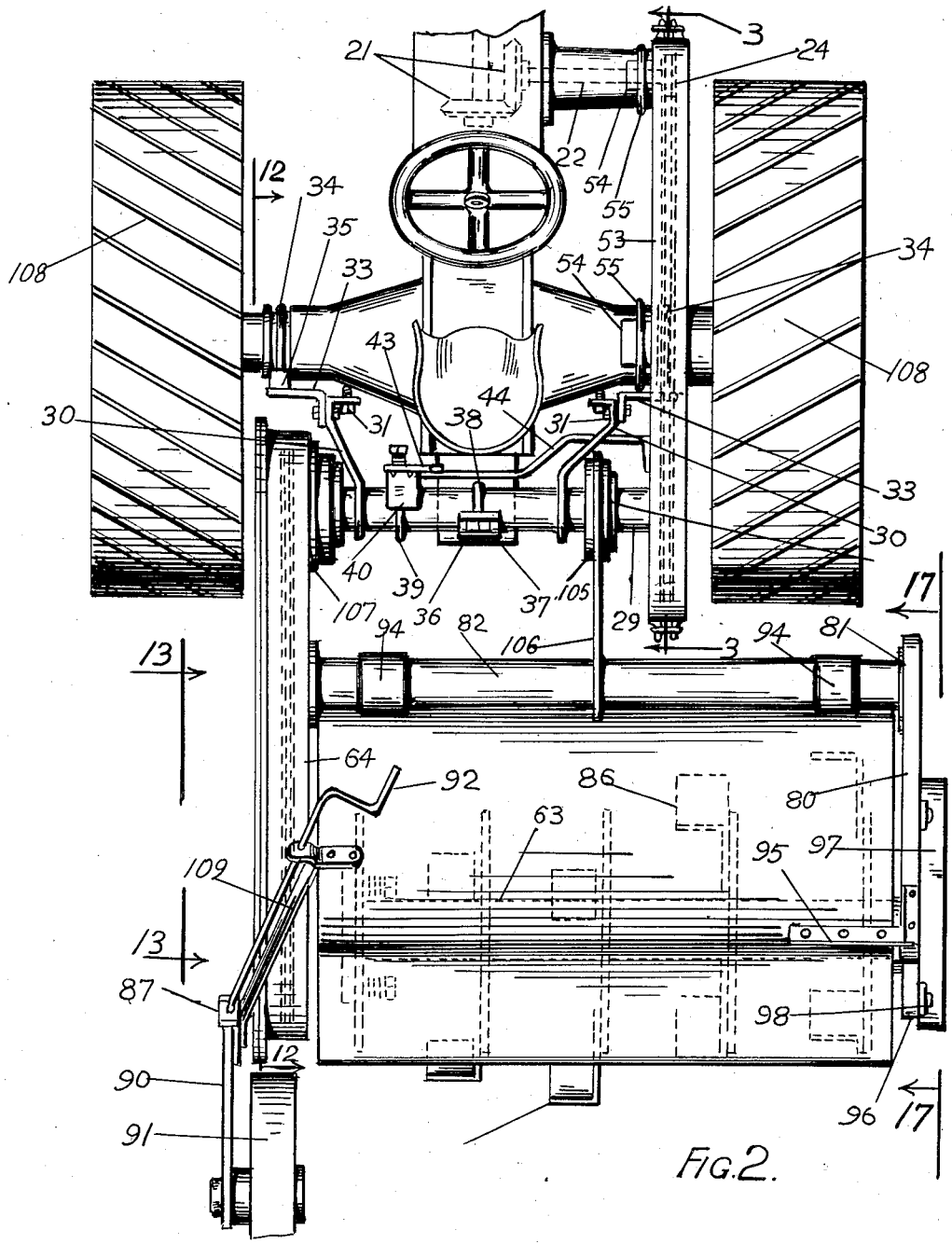
Figure 14:
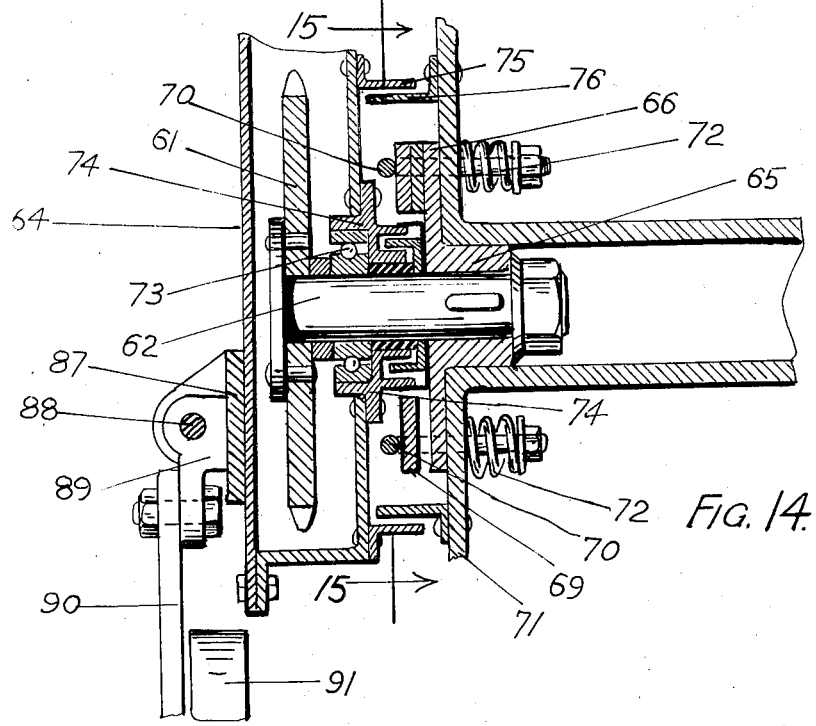
Figures 15, 16:
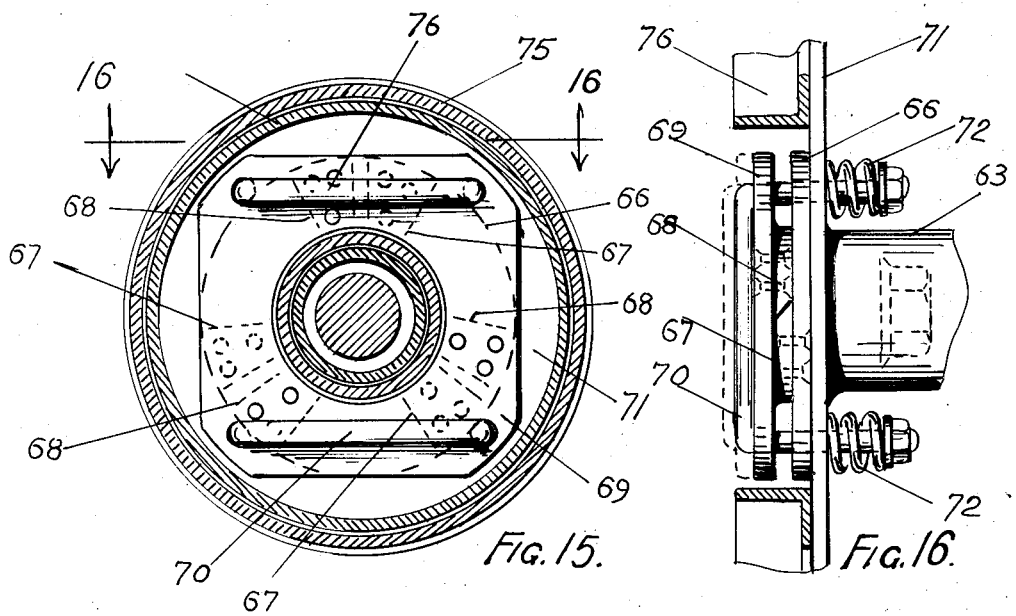
Figure 17:
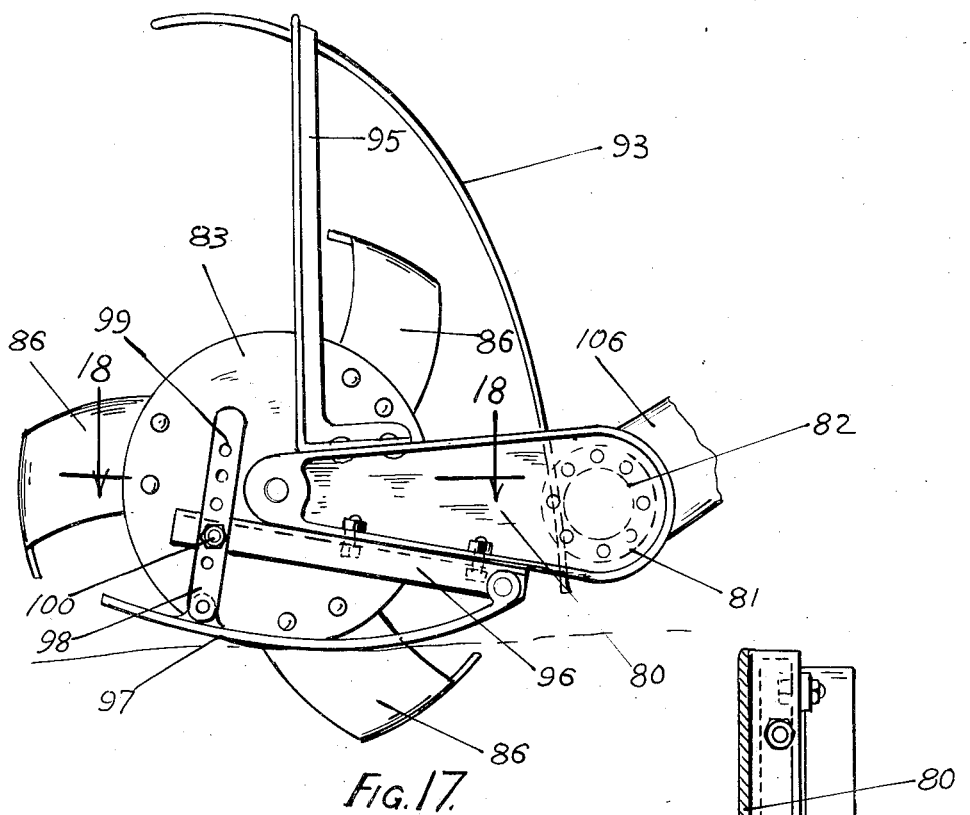
Figure 18:
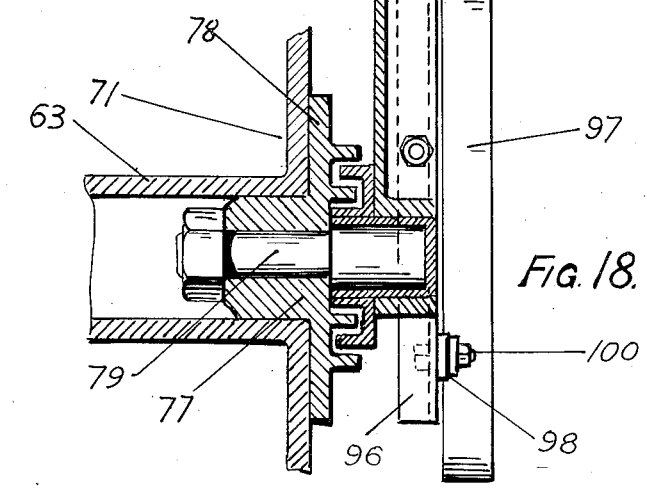

Referring to the accompanying drawings in which the invention is illustrated, Fig. 1 is a perspective view of a tractor with the cultivator attached thereto; Fig. 2 is a plan view thereof; Fig. 3 is a sectional elevation of the chain drive means on line 3—3, of Fig. 2; Fig. 4 is a broken plan view partly in section taken on line 4—4, of Fig. 3; Fig. 5 is a broken elevational view taken on line 5—5, of Fig. 4; Fig. 6 is a sectional view taken on line 6—6, Fig. 4; Fig. 7 is a sectional view taken on line 7—7, Fig. 4; Fig. 8 is a plan view partly in section illustrating means for driving the cultivator unit; Fig. 9 is a sectional view taken on line 9—9, Fig. 8; Fig. 10 is a sectional view taken on line 10—10, Fig. 4; Fig. 11 is a detail sectional view corresponding with Fig. 10; Fig. 12 is a sectional view taken on line 12—12, Fig. 2; Fig. 13 is a broken elevation view taken on line 13—13, Fig. 2; Fig. 14 is a sectional view taken on line 14—14, Fig. 12; Fig. 15 is a sectional view taken on line 15—15, Fig. 14; Fig. 16 is a sectional view taken on line 16—16, Fig. 15; Fig. 17 is an elevational view taken on line 17—17, Fig. 2; and Fig. 18 is a sectional view taken on line 18—18, Fig. 17.

The pulley shaft 22 of the tractor is connected to the engine power shaft through the bevel wheels 21. On one end of the pulley shaft 22 is fixed the sprocket pinion 23 which is drive connected by the chain 24 with the sprocket wheel 25 which is loosely mounted on one end of the power conveying shaft 27 through the ball bearing 110. The shaft 27 is journalled at one end in ball bearings 26 and at the other end in ball bearings 28. Said shaft 27 is carried in a tubular housing 29 which has formed integral therewith the arms 30. At their outer ends said arms are bent and are adapted to receive the adjustable bolts 31 adapted to abut the casing 32 of the differential gear of the tractor.

Brackets 33 serve to connect the arms 30 with the U-bolts 34 which surround the reduced ends of the differential gear casing 32. Such bolts have associated with them the packing blocks 35. Arranged about centrally of the housing 29 and secured to the draw bar 36 is the bracket 37 adapted to receive the ends of the U-bolt 38 which takes around the housing 29.

Secured to the housing 29 by means of the U-bolt 39 is the bracket 40, the latter having notches 41 therein to receive the tooth 42 of the lever 43 which is pivoted to an extension of one arm of the U-bolt 39 (Fig. 9). Pivoted to the lever 43 is one end of the rod 44 whose other end carries a fork 45 in engagement with the slidable clutch 46 furnished with projecting pins 47 adapted to pass through holes 49 in the sprocket wheel 25 and also engaging openings 50 in the disc 51 which is keyed to the shaft 27 when the rod 44 is operated in one direction to slide the clutch 46 in one direction; but when the rod 44 is operated in the opposite direction the clutch 46 is then moved in the opposite direction and the pins 47 are then withdrawn from the openings 50 in the disc 51 and the shaft 27 is therefore not rotated. There is an opening 52 in one of the arms 30 through which the rod 44 passes. The chain 24 which connects the sprocket wheel 25 to the sprocket pinion 23 is enclosed by the casing 53 secured to the tractor by means of flanges 54 on said casing and U-bolts 55 (Fig. 2). Said rod 44 is operated as desired by moving the lever 43 which is located within easy reach of the driver of the tractor. The coil spring 56 serves to keep the lever 43 in close contact with the faces 57 and 58 of the bracket 40.

Keyed to that end of the shaft 27 which is opposite to that upon which the sprocket wheel 25 is carried is a sprocket pinion 59 which is connected by chain 60 with a sprocket wheel 61 fixed to a stub spindle 62 located at one end of the tubular shaft 63. The chain 60 is enclosed by the casing 64.

Keyed to the stub spindle 62 is the boss 65 of the disc 66. Such boss fits within the tubular shaft 63. On the outer face of the disc 66 are preferably angled projecting sectors 67; these sectors are adapted under conditions to abut preferably angled projecting sectors 68 on the abutting face of the plate 69. Opposite arms of the U-bolts 70 pass into openings in the plate 69 and also openings in the flange 71 on the tubular shaft 63. Compressible coil springs 72 surround the arms of the U-bolts 70 and at one end abut nuts on such arms and at the other end the flange 71. The stub spindle 62 is journalled in ball bearings 73 carried in a dust proof cap 74 secured to the casing 64. On the latter are flanges 75 co-operating with flanges 76 on the flange 71 of the tubular shaft 63.

The opposite end of the shaft 63 is journalled on the boss 77 of the disc 78 which abuts the flange 71 on the shaft 63 (Fig. 18). Such boss 77 carries a stub spindle 79 fitting an opening in one end of the arm 80 whose other end is affixed to a flange 81 on one end of the support 82 whose other end is secured to the casing 64.

Fixed to the tubular shaft 63 are a series of flanges 83 which have affixed to them in any desired manner cutter blades 86. One or more of the flanges 83 may be made adjustable on the shaft 63 for the purpose of enabling cultivation of soil to be effected between rows of planted crops. There may be any number of such blades 86. Affixed to the casing 64 is the bracket 87 in which is fitted the screw 88; working about the screw 88 is the tapped bracket 89 which also serves as a connector for the arm 90 which carries the spindle of the land wheel 91. The screw 88 has connected to one end of it an operating rod having a cranked end 92.

A bent shield plate 93 is attached at one end to the support 82 by means of the flanges 94 on such support and at one side it is also attached to the stanchion 95 whose foot is affixed to the arm 80. The other side of the said shield is attached to the stanchion 109 whose foot is affixed to the bracket 87. The lower face of the arm 80 has fixed thereto a plate 96 which has pivoted to one end of it one end of the slider 97; the other end of the latter is pivoted to an adjustable link bar 98 provided with a series of openings 99 whereby such bar may be adjusted in relation to the bolt 100 fitting the plate 96.

Surrounding one end of the shaft 27 is the dust proof sleeve 101. The slidable clutch 46 slides on such sleeve. Fitting the housing 29 are the bushes 102. Both these bushes have eccentric flanges 103; on one of said flanges is adjustably carried by means of the bolts 104 and the clamp plate 105 one end of the link arm 106, the other end of such arm being adapted to receive the support 82. The other eccentric flange 103 is adjustably connected by means of the bolts 104 and clamp plate 105 to a flanged plate 107 attached to the casing 64.

In operation, after adjusting the bolts 31 for the purpose of aligning the shaft 27 with the axles of the wheels 108 of the tractor and also adjusting the link rod 106 and casing 64, so as to ensure that the tubular shaft 63 is aligned with the shaft 27, and by such adjustments simultaneously adjusting the sprocket chains 24 and 60 on their respective sprocket devices 23 and 25 and 59 and 61, the shaft 63 and the cutting blades 86 carried thereon may be rotated, after the engine of the tractor has been started, by operating the lever 43, whereby the rod 44 will be operated and the clutch 46 made to engage with the disc 51. Upon such engagement the sprocket wheel 25 and the shaft 27 are rotated through the chain 24 and power is conveyed from the shaft 27 through the chain 60 passing over the sprockets 59 and 61, the latter being attached to the stub spindle 62.

The spindle 62 drives the shaft 63 and the cutting blades 86 attached thereto through the projections 67 on the flange 66 engaging with the projections 68 on the plate 69, the latter being normally held to the flange 66 by means of the coil springs 72 on the bolts 70 passing through the plate 69. When, however, the blades 86 meet an obstruction the projections 67 ride on and slip over the projections 68 and the springs 72 are compressed whereby the plate 69 is moved outwardly from the flange 66 (see dotted line Fig. 16) and the shaft 63 and the blades 86 thereby remain stationary, whereas the spindle 62 is free to rotate independently of the shaft 63.

Depth of cut of the blades 86 is regulated by operating the rod 92 and through such rod the screw 88 and tapped bracket 89, so that the land wheel 91 may be raised or lowered depending on the operation of the rod 92. If it is desired to wholly raise the blades 86 from the ground to permit of transportation of the tractor it is only necessary to lower the bracket 89 sufficiently to raise the blades 86 above the ground face of the land wheel 91.

Adjustment of the slider or runner 97 may be made as desired through the link rod 98 and the bolt 100. Such slider serves to enable the tractor to pass readily over any pockets or projections in the ground which is being operated on.

What I claim as my invention and desire to secure by Letters Patent is:—

1. In combination, a tractor, a sleeve mounted on the draw-bar thereof, a power transmitting shaft journalled in said sleeve, a frame pivoted on said power shaft to swing vertically thereon, a tool carrying shaft journalled in said frame, means for adjusting said tool shaft vertically, a driving connection between the tool shaft and the power shaft, means for adjusting the sleeve about a vertical axis coincident with the draw-bar, and a chain sprocket on said power shaft.

2. An arrangement as claimed in claim 1 characterized in that the driving connection between the tool shaft and the power shaft includes an overload releasable clutch.

3. In an implement of the class described, a transverse sleeve, a shaft journalled in said sleeve, a frame having bearings mounted on said shaft, one side of said frame having a disk rotatable thereon and carrying its bearing eccentrically placed thereon, means for adjusting said disk axially in a plurality of positions and a tool carrying shaft rotatably mounted in said frame.

4. Rotary hoe cultivator for tractors according to claim 1, including adjustable eccentric means associated with said sleeve and also with said frame whereby the tool shaft may be aligned with the said power shaft.

5. A rotary hoe cultivator for tractors including a power conveying shaft, a drive chain device connected with the power conveying shaft and adapted to be operatively applied to the pulley shaft of the engine of a tractor, rotary hoe cultivator means including a rotatable shaft, a chain device connecting said power conveying shaft with said rotatable shaft, adjustable means associated with the power conveying shaft and adapted to be applied to the casing of the differential gearing of a tractor whereby said power conveying shaft may be aligned with the tractor wheel axles and said first mentioned chain device may be adjusted simultaneously with the aligning of the power conveying shaft, and adjustable means between said power conveying shaft and the drive chain device for said rotatable shaft whereby the latter shaft may be aligned with the power conveying shaft and the latter drive chain device may be adjusted simultaneously with the aligning of the rotatable shaft.

In testimony whereof I affix my signature.

ARTHUR CLIFFORD HOWARD.